April 18, 1950  J. W. MEYERS  2,504,715
LAWN RAKE AND CARRIER
Filed June 10, 1946  2 Sheets-Sheet 1
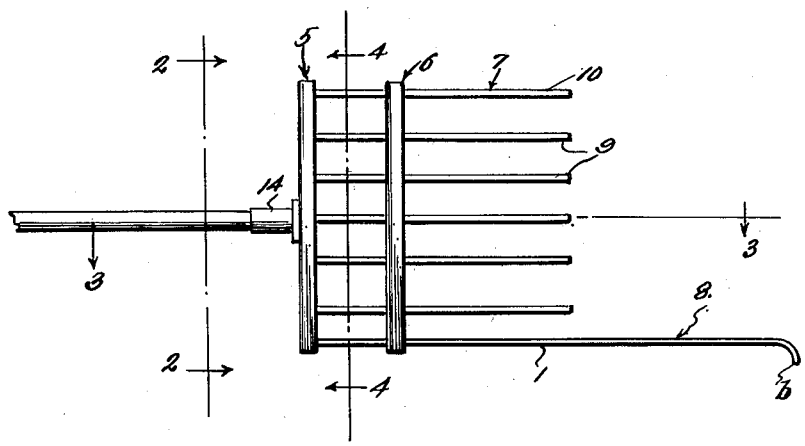
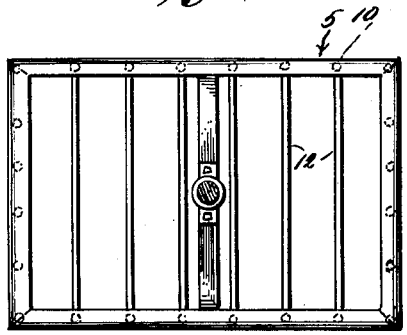
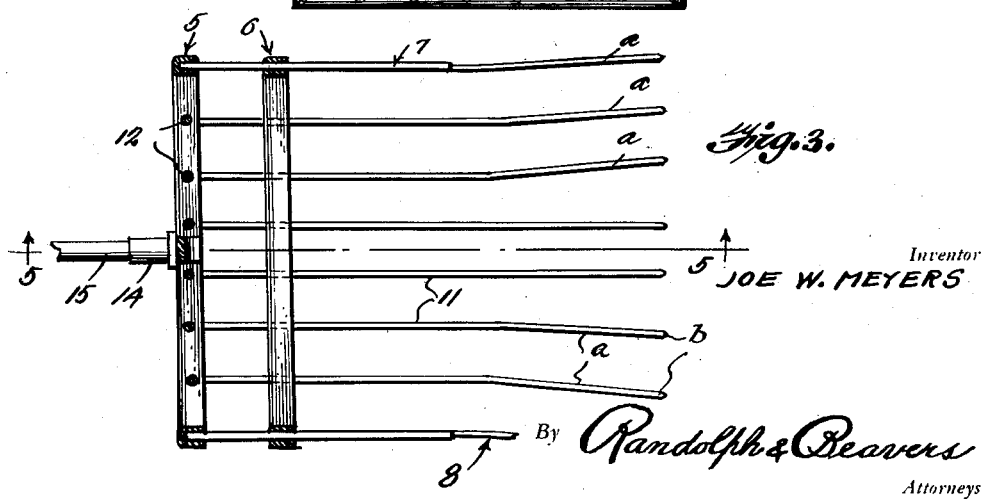
Inventor
JOE W. MEYERS
By Randolph & Beavers
Attorneys April 18, 1950 J. W. MEYERS 2,504,715
LAWN RAKE AND CARRIER
Filed June 10, 1946 2 Sheets-Sheet 2
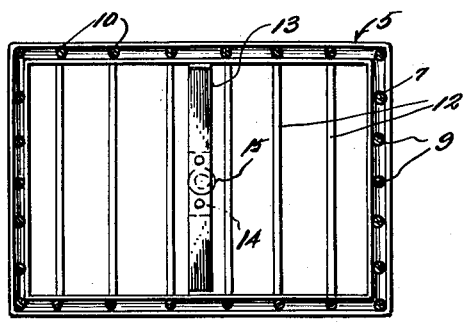
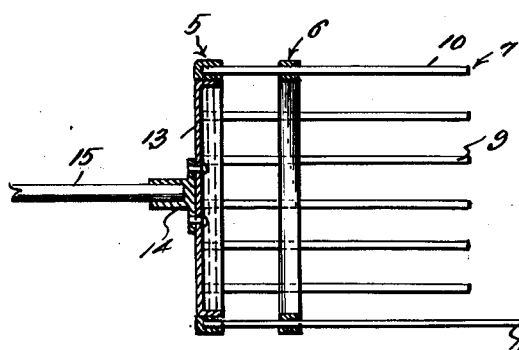
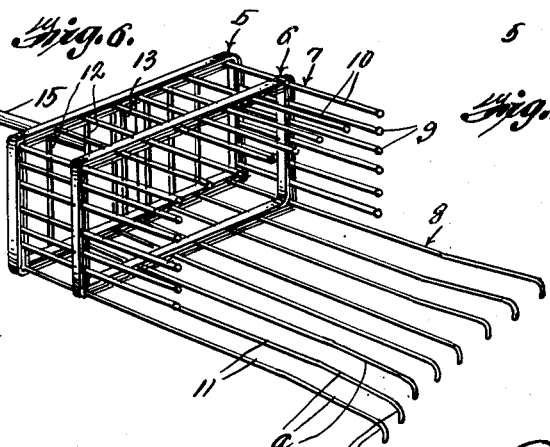
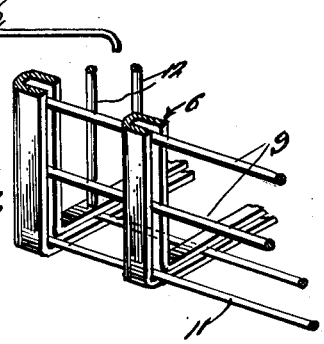
Inventor
JOE W. MEYERS
By Randolph & Beavers
Attorneys Patented Apr. 18, 1950

2,504,715

UNITED STATES PATENT OFFICE 2,504,715

LAWN RAKE AND CARRIER

Joe W. Meyers, Weleetka, Okla.

Application June 10, 1946, Serial No. 675,774

1 Claim. (Cl. 56—400.11)

This invention relates to garden and lawn implements and more particularly to a lawn rake incorporating means in conjunction therewith whereby leaves and various other debris may be transported from one point to another with ease.

An important object of the present invention is to provide a combination lawn rake and debris carrier, whereby after raking leaves, grass cuttings and various other items into a pile, said pile can be conveniently moved by hand or implement into the carrier which forms part of the ensemble.

Another object of the invention is to provide a combination lawn rake and debris carrier which will facilitate the overall operation of raking and transporting lawn and garden debris.

A further object of the invention is to provide such a combination implement which can be manufactured reasonably and which because of its sturdy construction is not susceptible to the ready development of defects.

These and various other objects and advantages of the invention will become apparent to the reader of the following description.

In the drawings:

Figure 1 is a fragmentary side elevational view of the implement;

Figure 2 is a cross section taken on line 2—2 of Figure 1;

Figure 3 is a fragmentary horizontal sectional view taken on line 3—3 of Figure 1;

Figure 4 is a transverse sectional view taken on line 4—4 of Figure 1;

Figure 5 is a fragmentary longitudinal sectional view taken on line 5—5 of Figure 3;

Figure 6 is a fragmentary perspective view of the implement;

Figure 7 is an enlarged fragmentary perspective view of one rear side portion of the implement.

Referring to the drawings, the implement is provided with a pair of frame structures generally referred to by numerals 5, 6, these frames preferably being of rectangular shape, the frame 6 being located spaced forwardly from the frame 5, and both frames being preferably of channelled structure, with their channelled sides facing forwardly.

Incident to the use of the frames, there is a basket structure generally referred to by numeral 7 and a rake generally referred to by numeral 8.

The basket 7 is located above the rake 8 and is made up of vertically spaced side rods 9, forming the two sides of the basket and horizontally spaced top rods 10, which serve to form the top of the basket, while the rake 8 is made up of a plurality of horizontally spaced tines 11 of spring steel, the rearward portions of which form a bottom for the basket 7.

As is apparent in Figures 5 and 7, the rods 9 and 10, along with the tines 11, extend through openings in the channelled frame 6 and terminate within the confines of the channel of the channelled frame structure 5. These parts may be welded or otherwise secured to the channelled frame structures 5, 6, the frame 6 serving to rigidify and reinforce the basket structure and serve as supplemental anchoring means for the tines 11.

The top and bottom portions of the frame structure 5 are bridged by vertically disposed rods 12 forming a back for the basket 7, and a bridge member 13 in the form of a plate of elongated narrow formation, having its upper and lower portions turned forwardly and spot-welded or otherwise secured to the frame structure 5, and to the back side of this plate 13, a ferrule or socket structure 14 is secured, for receiving the forward end of an elongated handle 15.

It is preferable that two, three or more of the outermost tines 11, be disposed obliquely in a lateral direction, as denoted by reference character a, to allow for a greater sweep of the rake. The free ends of the tines are curved downwardly as at b for the obvious purpose of securing a better purchase on the material to be raked.

At this point, it will be observed that the rods 9 and 10 forming the sides and top of the basket may extend farther toward the bent-down ends b of the rake, to afford a deeper basket, if desired.

The basket rods 9, 10 may be of heavier or larger gauge material than the tines 11, which are preferably flexible to afford the proper raking contact with leaves and other debris without damaging the lawn.

It will be seen from the above, that a sturdy reinforced structure is presented by reason of the presence of the two frames 5, 6, which not only anchor the tines of the rake 8, but also definitely fix the bars 9, 10 of the basket 7, in proper spaced relation. Further, the particular relationship of the frames, rods 9, 10 and tines 11 go together to formulate a structure having the combination aspects stated, without materially increasing the overall weight of the ensemble in comparison to present-day leaf rakes, now in general use.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A rake structure comprising a back frame, a forward frame, the back and forward frames being provided with elongated tines bridging the same at the lower portions thereof and extending well in advance of the forward frame, said tines being provided with downwardly turned free end portions, shorter tines bridging the side and top portions of the frames, said back frame being provided with a cross member, an elongated handle extending from said cross member, said back frame being provided with cross members, in addition to the first mentioned cross member.

JOE W. MEYERS.

REFERENCES CITED

The following references are of record in the file of this patent:

UNITED STATES PATENTS

| Number | Name | Date |
|---|---|---|
| 378,775 | Disbrow | Feb. 28, 1888 |
| 566,868 | Reed | Sept. 1, 1896 |
| 1,095,585 | Mack | May 5, 1914 |
| 1,610,842 | Young | Dec. 14, 1926 |
| 1,923,381 | Layne | Aug. 22, 1933 |